United States Patent [19]

Bononi

[11] 4,375,911

[45] Mar. 8, 1983

[54] COATING FOR EYEGLASSES

[76] Inventor: Walter H. Bononi, Zeppelinstrasse 9, 7012 Fellbach-Schmiden, Fed. Rep. of Germany

[21] Appl. No.: 156,867

[22] Filed: Jun. 5, 1980

[30] Foreign Application Priority Data

Jun. 6, 1979 [DE] Fed. Rep. of Germany ... 7916275[U]

[51] Int. Cl.³ .......................... G02C 5/14; G02C 5/02
[52] U.S. Cl. ...................................... 351/122; 2/446; 351/124
[58] Field of Search .............. 351/111, 117, 139, 122, 351/123, 118, 67, 114; 428/391, 405; 427/168; 2/446

[56] References Cited

U.S. PATENT DOCUMENTS

| 1,922,767 | 11/1931 | Humpner | 351/139 |
| 2,259,082 | 10/1941 | Ring | 351/122 |
| 3,042,548 | 7/1962 | Aikens | 351/122 |

FOREIGN PATENT DOCUMENTS

| 2739905 | 3/1979 | Fed. Rep. of Germany | 351/132 |
| 1535556 | 7/1968 | France | 351/122 |

Primary Examiner—John K. Corbin
Assistant Examiner—Rodney Bovernick

[57] ABSTRACT

The inner surface of the temples of eyeglasses or the bridge connecting the lens bows, at least in areas that come in contact with the wearer's skin, has a thin, glassy base coat. Over the base coat is a thin, air-hardened, sprayed silicone elastomer coating.

5 Claims, 3 Drawing Figures

COATING FOR EYEGLASSES

BACKGROUND OF THE INVENTION

The invention concerns a coating, applied to the inner surface of the temples of eyeglasses and/or the bridge connecting the lens bows, insofar as this bridge comes in contact with the skin of the wearer of the glasses, particularly in the case of plastic frames.

Such a coating is known from German Patent Document No. 25 46 767, although in said patent an attempt was made through special measures to reduce the specific compression. This solution, even for the purposes cited there, is not marketable.

OBJECT AND STATEMENT OF THE INVENTION

The purpose of the present invention is the improvement in the fit of the eyeglasses. In addition, this solution is to be both esthetic and inexpensive. It should if possible also lend itself to application on finished eyeglasses, and should not essentially change these. The solution should be durable, for high quality frames as well.

According to the invention, these objectives are accomplished through the following characteristics:

(a) On the inner surface and/or the bridge, a thin, glassy base coat is applied for silicone elastomer spray.

(b) Over the base coat, a thin, air-hardening silicone elastomer coating is applied.

Such coatings per se are known for insulation of electrical wiring in low voltage circuits. They help to prevent current leakage.

The invention has the following advantages:

(a) Friction is increased over a large surface.

(b) The structure of the eyeglasses does not change and a change in appearance is detected only upon very close inspection. Such a change occurs only at places that are invisible when the glasses are worn.

(c) The manufacturer's name, trademarks or codes for the glasses can be applied as usual, as they are completely visible through the coatings.

(d) The eyeglasses maintain their fit even in the rain and under similar conditions, since the silicon spray is water repellent, and the effect obtained is similar to that of the waxing of the underside of surfboards.

(e) Since the coatings are extremely thin the eyeglasses has the same fit after as before treatment.

(f) In the usual fashion the coating is also applied to the ear part of the temple. When the glasses are folded, only the soft silicone elastomer coating comes in contact in some cases, and although it is very thin this will suffice to prevent the usual scratching of the glasses.

(g) In addition, a firmer grip is assured when the glasses are picked up.

(h) When the silicone elastomer coating is applied, its surface assumes a roughness similar to an extremely fine wrinkle finish. This increases adhesive power, but does not cause discomfort and the frames still slide over hair without disturbing it.

(i) Color is not affected.

Advantageously, the invention has the following additional features:

The silicone elastomer coating is arranged on a lacquered coating adhering to the inner surface of the temples and/or the bridge. Due to these characteristics, the invention can also be applied to glasses that have a lacquered finish, as is the case today with most glasses. This coating even adheres to a lacquered finish and protects it naturally precisely at those points where the finish is most easily damaged.

The coating of course protects the frame material if the frame does not have a lacquered finish.

The silicone elastomer coating is arranged on a roughed surface on the inner surface of the temples and/or the bridge. Due to these characteristics, adhesion of the base coat can be further improved, although the invention is also suitable for frame parts that have been given a high gloss finish in a tumbling barrel.

The silicone elastomer coating is composed of the "Silicoat" material by Inventa GmbH. The coating according to this has proven very effective.

The silicone elastomer coating is a spray-on coating. Due to these characteristics—possibly combined with the use of a template—quick treatment and an even wrinkle finish effect is possible.

The silicone elastomer coating is arranged on a transparently thin base coat. Due to these characteristics, the silicone elastomer coating has a particularly high adhesive power and possible trademarks, codes or the like remain fully visible.

DESCRIPTION OF THE DRAWING

The invention shall now be explained by means of a preferred embodiment of an example. In the drawing.

DETAILED DESCRIPTION

Temple 11 has the usual structure and consists of plastic. On its inner surface 12 it has a code 13 and a trademark 14.

Figure 1:
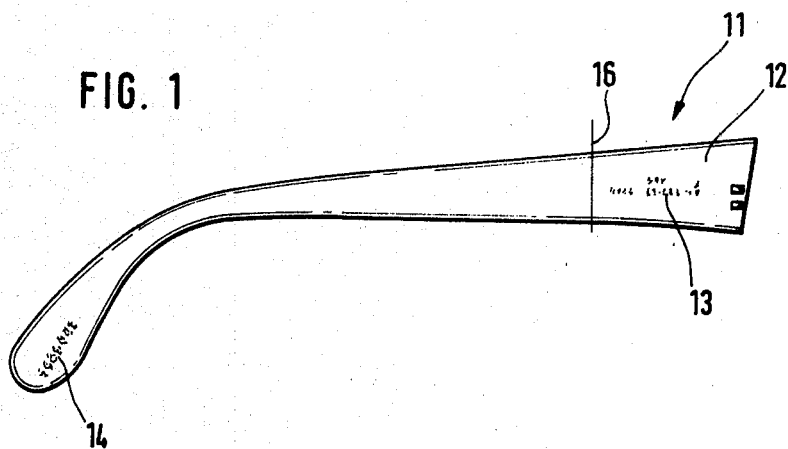
FIG. 1 shows the inner surface of a temple.
Figure 2:
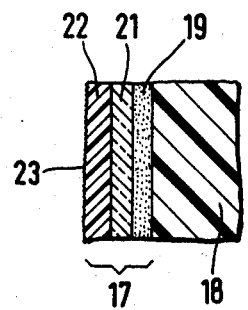
FIG. 2 shows a greatly magnified sample, taken from the inside [cross-section] of the temple according to FIG. 1.

In FIG. 1, the surface left of a demarcation line 16 is provided with a coating 17 which appears in greater detail in FIG. 2. In FIG. 2 is seen plastic material 18, such as cellulose acetate. The plastic material is covered by a lacquered coating 19. As usual, this was given a high gloss finish in a tumbling barrel.

Lacquered coating 19 has a clear base coating 21 which is available from Wacker-Chemie, Munich.

A silicone elastomer coating whose outer surface 23 has a coarseness visible to the naked eye, is applied to base coat 21. Silicone elastomer coating 22 is a spray-on coating. The Silicoat-Spray of Inventa GmbH, Munich, was used here.

Figure 3:
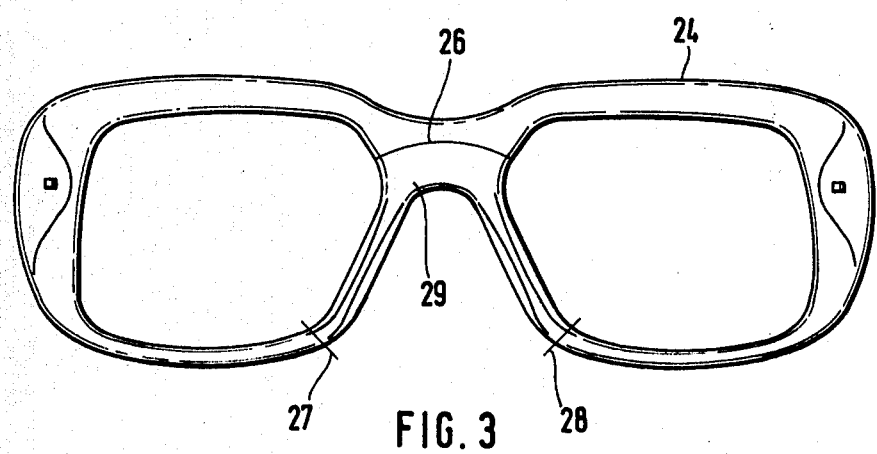
FIG. 3 shows the back side of the lens bow that is part of the temple according to FIG. 1.

According to FIG. 3, the area of lens bows 24 delineated by lines 26, 27, 28 was provided with base coat 21 and silicon coating 22. This area 29 corresponds to that area which normally comes into contact with the skin of the wearer.

Plastic material 18 must not necessarily be provided with a lacquered coating 19. With regard to wearing criteria, the same results are obtained when the lacquered surface 19 is absent. In addition, it is not imperative that plastic material be used. The invention is also suitable for eyeglasses made of natural material, such as horn. "Plastic frames" are accordingly understood to be those which have the form typical for such frames, in contrast to metal frames.

Insofar as the ear portion of the temple in the case of metal frames has a plastic shaft, this shaft may also be provided with the coating.

I claim:

1. On the temple or the bridge connecting the lens bows of eyeglass frames, the improvement comprising an extremely thin, air-hardened, silicone elastomer coating at the inner surface of said temple or said bridge, at least in the area which contacts the wearer's skin, said silicone elastomer being a sprayed-on coating thin enough to be transparent to the surface of the frames beneath the coating and having a surface roughness similar to a fine wrinkle finish.

2. The improvement according to claim 1 wherein said silicone elastomer coating is composed of "Silicoat" material, manufactured in Germany by inventa GmbH.

3. The improvement according to claims 1 or 2 comprising a lacquered coating adhering to the inner surface of said temple or bridge, said silicone elastomer coating being arranged on said lacquered coating.

4. The improvement according to claim 3, comprising a rough surface on the inner surface of said temple or bridge, said silicone elastomer coating being arranged on said rough surface.

5. The improvement according to claim 3 comprising a transparently thin base coat on the inner surface of said temples or bridge, said silicone elastomer coating being arranged thereon.

* * * * *